United States Patent
Lewis et al.

(10) Patent No.: US 10,682,935 B2
(45) Date of Patent: Jun. 16, 2020

(54) COVER PANEL FOR VEHICLE SEAT WITH INVISIBLE TIE-DOWN

(71) Applicant: GM GLOBAL TECHNOLOGY OPERATIONS LLC, Detroit, MI (US)

(72) Inventors: Matthew Lewis, Milford, MI (US);
Jesse J. Kriesel, Oxford, MI (US);
Stacy N. Kuchlbauer, Keego Harbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/802,611

(22) Filed: Nov. 3, 2017

(65) Prior Publication Data
US 2019/0135147 A1 May 9, 2019

(51) Int. Cl.
*B60N 2/58* (2006.01)

(52) U.S. Cl.
CPC ......... *B60N 2/5833* (2013.01); *B60N 2/5825* (2013.01); *B60N 2/5875* (2013.01)

(58) Field of Classification Search
CPC ... B60N 2/5833; B60N 2/5875; B60N 2/5825
USPC .............. 297/452.6, 452.61, 452.58, 452.59
See application file for complete search history.

(56) References Cited

U.S. PATENT DOCUMENTS

| | | | | |
|---|---|---|---|---|
| 3,127,201 A | * | 3/1964 | Granlund | A47C 5/06 29/512 |
| 4,833,741 A | * | 5/1989 | Mizuno | A47C 7/18 264/275 |
| 5,236,243 A | * | 8/1993 | Reyes | B60N 2/5833 24/442 |
| 5,733,001 A | * | 3/1998 | Roberts | B60N 2/5825 24/297 |
| 6,045,151 A | * | 4/2000 | Wu | B60R 21/207 280/728.3 |
| 8,522,406 B2 | * | 9/2013 | Voigt | B60N 2/5825 24/306 |
| 9,789,796 B1 | * | 10/2017 | White | B60N 2/565 |
| 10,137,808 B2 | * | 11/2018 | Nagasawa | A47C 31/02 |
| 2008/0309143 A1 | * | 12/2008 | Booth | A47C 7/20 297/452.56 |
| 2012/0133194 A1 | * | 5/2012 | Takehara | A47C 31/023 297/452.58 |
| 2016/0129818 A1 | * | 5/2016 | Sahashi | B60N 2/70 297/452.61 |

* cited by examiner

*Primary Examiner* — Cassandra Davis (57) ABSTRACT

A cover panel for installation over foam of a vehicle seat includes a first layer with an occupant-facing surface and a foam-facing surface. The foam-facing surface is located opposite to the occupant-facing surface. The first layer is configured to cover at least a portion of the foam of the vehicle seat. The cover panel further includes a second layer bonded to the foam-facing surface of the first layer such that the second layer is obscured from view by the first layer. The cover panel also includes a tie-down connected to the second layer that projects away from the foam-facing surface, wherein the tie-down is configured to tension the first layer when the tie-down is pulled away from the foam-facing surface.

15 Claims, 5 Drawing Sheets

COVER PANEL FOR VEHICLE SEAT WITH INVISIBLE TIE-DOWN

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a cover panel used on a vehicle seat with a hidden tie-down.

Vehicle seats and other visible trim structures in vehicles are often covered with aesthetically-pleasing cover materials. Such aesthetically-pleasing cover materials can include leather, cloth or vinyl materials as well as others. Vehicle seats and other visible trim structures can have complex shapes and other profiles that can be difficult to cover with the aforementioned aesthetically-pleasing cover materials because wrinkling, bridging, folding or other imperfections can occur when the cover material is secured over the complex shape.

In some instances, the cover material is divided into multiple pieces that are connected together and/or individually secured to the complex shape of the vehicle seat or other visible trim structure in order to prevent the wrinkling, bridging or folding that may otherwise occur. The seams that connect the multiple pieces of the cover material are visible in typical applications. Such visible seams can be aesthetically undesirable in some vehicle designs.

SUMMARY

In one example of a cover panel installed over foam of a vehicle seat in accordance with the present disclosure, the cover panel includes a first layer with an occupant-facing surface and a foam-facing surface. The foam-facing surface is located opposite to the occupant-facing surface. The first layer is configured to cover at least a portion of the foam of the vehicle seat. The cover panel further includes a second layer bonded to the foam-facing surface of the first layer such that the second layer is obscured from view by the first layer. The cover panel also includes a tie-down connected to the second layer that projects away from the foam-facing surface, wherein the tie-down is configured to tension the first layer when the tie-down is pulled away from the foam-facing surface.

In one aspect, the tie-down is stitched to the second layer.

In one aspect, the second layer is disposed parallel to the first layer.

In one aspect, the first layer covers both the second layer and the tie-down such that the second layer and the tie-down are not visible when the cover panel is assembled on the vehicle seat.

In one aspect, the tie-down is stitched to the second layer at one or more seams and the one or more seams are obscured from view by the first layer such that only the first layer is visible when the cover panel is assembled on the vehicle seat.

In one aspect, the cover panel further includes a second tie-down connected to the second layer. The second tie-down projects away from the foam facing surface, wherein the second tie-down is configured to tension the first layer when the second tie-down is pulled away from the foam facing surface.

In one aspect, the second layer is a layer of foam padding.

In one aspect, the tie-down includes a first attachment element. The first attachment element is configured to connect to a complimentary second attachment element disposed in a pocket in the foam of the vehicle seat.

In one aspect, the tie-down includes a tension portion and a tail portion. The tension portion is stitched to the second layer and is disposed between the first layer and the second layer. The tail portion projects away from the tension portion and into a pocket located in the foam of the vehicle seat.

In one aspect, the first layer has a smooth surface covering a portion of the vehicle seat having a concave profile.

In one aspect, the cover panel is included on a vehicle seat.

In another example in accordance with the present disclosure, a vehicle seat includes a foam structure having a concave profile and a pocket and a cover panel positioned over the foam structure. The cover panel includes a visible first layer extending over the concave profile and the pocket and a second layer disposed parallel to the first layer and bonded to the first layer such that the second layer is obscured from view by the first layer. The cover panel also includes a tie-down connected to the second layer and disposed between the first layer and the second layer. The tie-down includes a tail portion that projects away from the first layer and into the pocket of the foam structure, wherein the tie-down is configured to tension the first layer when the tie-down is pulled away from the first layer to maintain a smooth surface of the first layer across the concave profile and the pocket.

In one aspect, the tie-down and the second layer are covered by the first layer.

In one aspect, the pocket is disposed at a center of the concave portion.

In one aspect, the tie-down is stitched to the second layer by a plurality of seams and the seams are covered by the first layer.

In one example method in accordance with the present disclosure, a method of producing an uninterrupted surface across a concave foam structure on a vehicle seat includes sewing a tie-down to a substrate material such that a tension portion of the tie-down is positioned parallel to the substrate material and a tail portion of the tie-down projects away from the tension portion. The method also includes bonding the substrate material to a surface material to create a multi-layer cover panel such that the surface material and the substrate material are disposed parallel to one another and the surface material covers the substrate material and the tie-down. The method also includes installing the cover panel over the foam structure and connecting the tie-down to the foam structure to produce the uninterrupted surface across the concave foam structure.

In one aspect, the step of connecting the tie-down to the foam structure includes applying a force to the tail of the tie-down in a direction away from the surface material and connecting the tie-down in a pocket in the foam structure.

In one aspect, the surface material is a leather, cloth or vinyl decorative material and the substrate material is a layer of foam padding.

In one aspect, the step of connecting the tie-down to the foam structure results in the cover panel being secured in a position parallel to the concave foam structure.

In one aspect, the tie-down is disposed between the surface material and the substrate material when the substrate material is bonded to the surface material.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The cover panel of the present disclosure includes a multi-layered structure that permits the surface material (i.e., the layer of material that is visible when the vehicle seat is fully assembled) to be a smooth, uninterrupted surface across a curved surface of a vehicle seat. In existing designs, a cover panel for a vehicle seat is often divided into multiple panels that are connected together at seams in order to provide an unwrinkled surface over the curved portion of the seat.

The cover panel of the present disclosure includes a layer of substrate material with an integrated tie-down that is bonded to the surface material of the cover panel. The surface material covers the substrate layer and the tie-down so that the substrate layer, the tie-down and any seams that may exist between the substrate layer and the tie-down are not visible when the seat is fully assembled.

The tie-down is tensioned by attaching the tie-down in a pocket located in the foam structure of the seat. In this manner, the substrate layer and the surface material of the cover panel are tensioned and pulled against the curved foam structure of the seat to create a smooth, uninterrupted surface across the curved foam structure. This smooth, uninterrupted surface is more aesthetically pleasing than the surface that would otherwise exist if the seat included a cover panel that used existing designs.

The description below presents an example in which a cover panel of the present disclosure is used on a vehicle seat. As can be appreciated, the principles of the present disclosure can be applied to other instances in which a cover panel is secured over a complex shape. Such other applications can include other automotive applications, consumer product applications, aerospace applications, and marine applications including other seats, interior components, instrument panels, door trim panels, center consoles, furniture, and the like.

Figure 1:
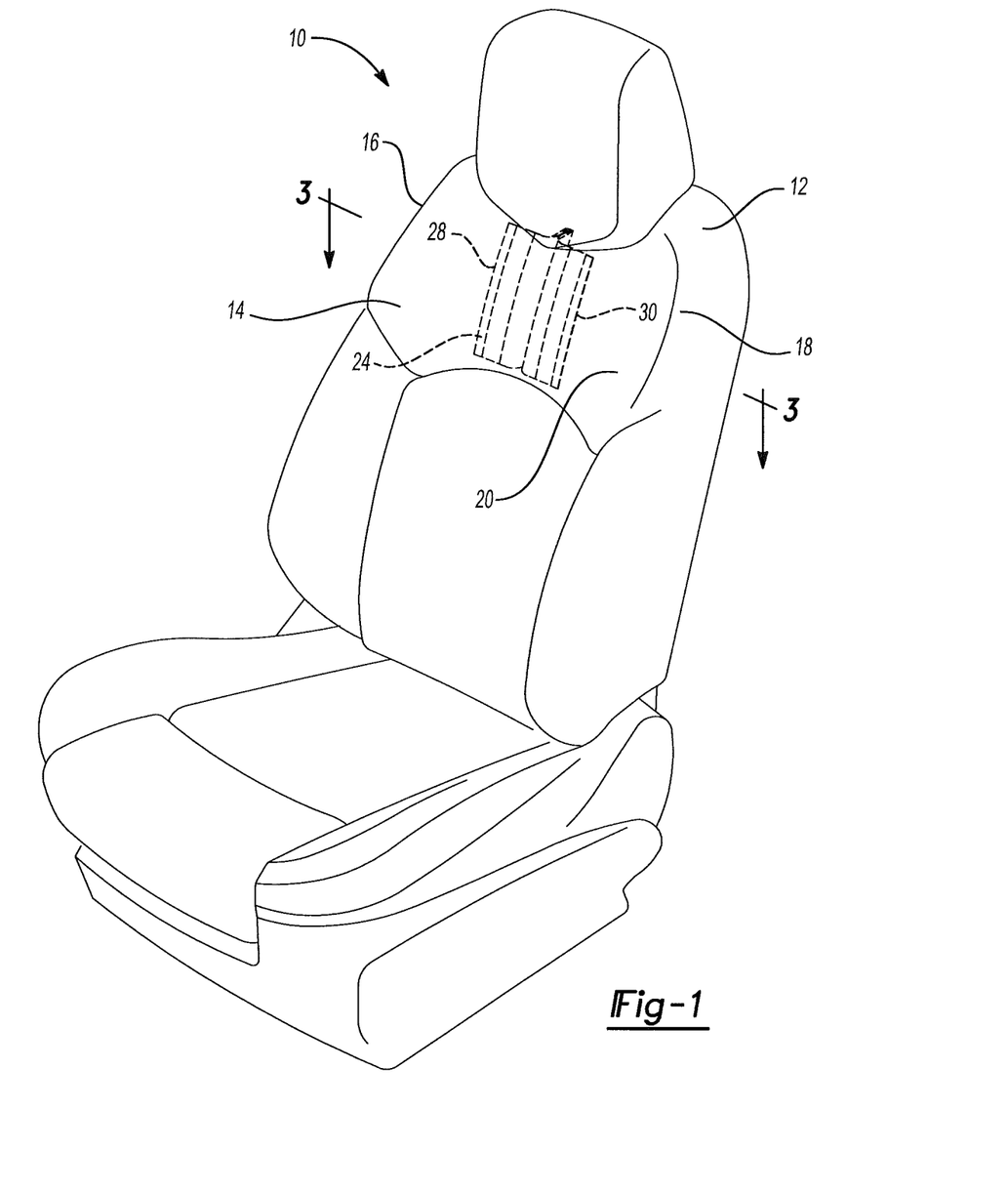
FIG. 1 is a perspective view of a vehicle with an example embodiment of a hidden tie-down in accordance with the present disclosure.

Referring now to FIG. 1, a vehicle seat 10 includes a seat back 12. The seat back 12 includes an upper portion 14 with a concave shape. The upper portion 14 has a smooth, uninterrupted surface across from a first side 16 to a second side 18. The seat 10 includes a cover panel 20 that is secured over the upper portion 14. The cover panel 20 includes one or more layers that enable the cover panel 20 to have the smooth, uninterrupted surface as shown.

Figure 3:
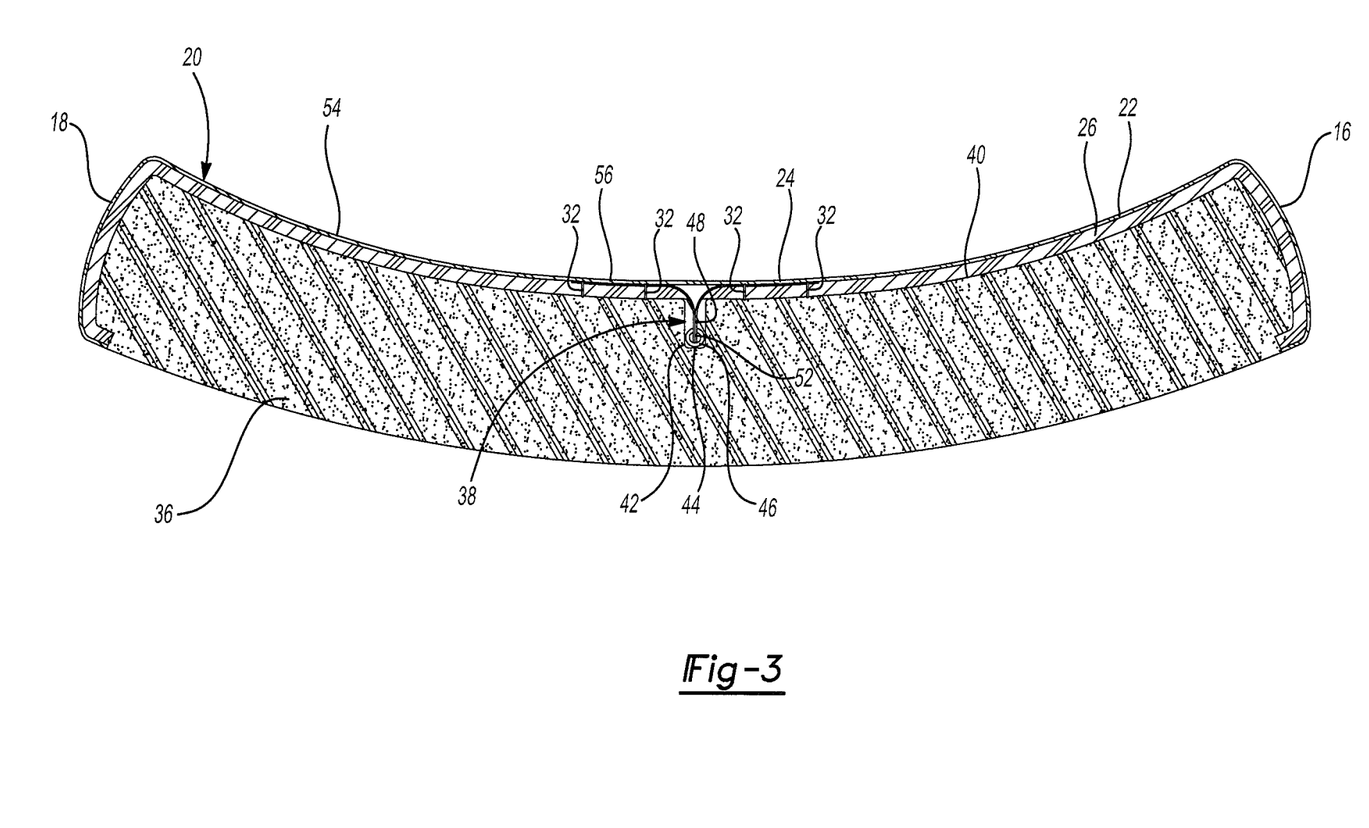
FIG. 3 is a sectional view of the example hidden tie-down of FIG. 1 cut along the plane indicated on FIG. 1.

The cover panel 20, as shown in FIG. 3, includes a first (or surface) layer 22. The first layer 22 is a layer of surface material that is the outermost layer of material on the seat 10. The first layer 22 can be any suitable material such as leather, cloth or vinyl. The first layer 22 is the layer of material of the seat 10 that contacts an occupant when an occupant sits in the seat.

Figure 2:
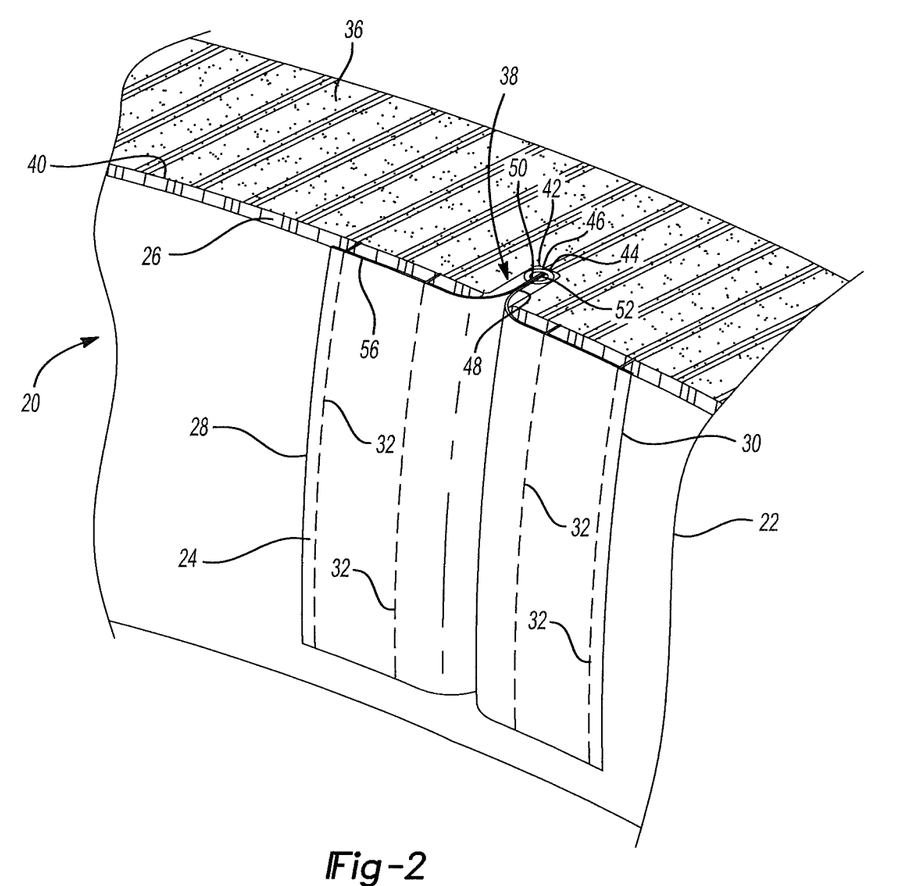
FIG. 2 is cut-away view of the example hidden tie-down of FIG. 1 with the cover panel removed.

As shown in FIGS. 2 and 3, the cover panel 20 also includes a tie-down 24 and a second (or substrate) layer 26. The tie-down 24 is a sheet of textile material that extends laterally across the center region of the seat 10. The tie-down 24 also extends vertically along the center of the seat 10. The tie-down 24 is not positioned across the entire surface of the upper portion 14 of the seat 10. Instead, the tie-down 24 has a first side edge 28 and a second side edge 30 that define the lateral borders of the tie-down 24.

The tie-down 24, in this example, is connected to the second (or substrate) layer 26 along one or more seams 32. The seams 32, in this example, are rows of stitching that are oriented vertically along the tie-down 24. In this example, the tie-down 24 is connected to the second layer 26 by four rows of stitches oriented parallel to one another and parallel to the first side edge 28 and the second side edge 30. In other examples, the tie-down 24 can be connected to the second layer 26 by more or less than four seams 32. The tie-down 24 can also be connected to the substrate layer by other suitable methods of attachment such as welding or by a suitable adhesive. The tie-down 24 can be made of any suitable flexible panel of material. In this example, the tie-down 24 is a non-woven textile material. In other examples, the tie-down 24 can be a woven textile material.

In the example shown in FIGS. 1-3, the tie-down 24 extends laterally outward from both sides of a pocket 38 in a foam panel 36 of the seat 10. In this example, the tie-down 24 extends laterally outward from a first side of the pocket 38 toward the first side edge 28. The tie-down 24 also extends laterally outward from a second side of the pocket 38 toward the second side edge 30. In other examples, the tie-down 24 may only extend from one side of the pocket 38. In such examples, the tie-down 24 would appear as one half of the tie-down 24 show in FIGS. 1-3. In such one-sided tie-downs 24, the tie-down 24 is sewn or otherwise connected to the second layer 26 at one or more seams 32.

The second (or substrate) layer 26, in this example, is a panel of foam padding. The foam padding can have any suitable thickness depending on the application. In this example, the second layer 26 has a thickness of 5 mm. In other examples, the second layer 26 is a layer of foam padding with a thickness in the range of 0.25 mm to 10 mm. In another example, the second layer 26 has a thickness in the range of 3 mm to 5 mm. In still other examples, the second layer 26 is a layer of suitable woven or non-woven textile material.

As shown in FIGS. 2 and 3, the tie-down 24 is connected to the second layer 26 such that the tie-down is located between the first layer 22 and the second layer 26. The second layer 26 is connected to the first layer 22 so that the tie-down 24 is secured in this position. The second layer 26 can be connected to the first layer 22 using any suitable method so long as the connection is not visible when the cover panel 20 is secured to the seat 10.

In this example, the second layer 26 is laminated to the first layer 22 after the tie-down 24 has been secured to the second layer 26. Any suitable lamination process can be used such as flame lamination, adhesive lamination, heat lamination, film lamination or the like. The lamination process creates the cover panel 20 that includes the first layer 22, the tie-down 24 and the second layer 26 joined together that can then be assembled to the seat 10. The lamination process joins the first layer 22 to the second layer 26 (with the attached tie-down 24) in a manner so that an occupant facing surface 54 of the cover panel 20 is smooth and uninterrupted (i.e., does not show a connection of the second layer 26 or the tie-down 24).

As shown in FIG. 3, the cover panel 20 is stretched over the foam panel 36 of the seat 10. The foam panel 36 has a profile that corresponds to the shape of the seat as shown in FIG. 1. The foam panel 36, in this example, has a concave shape. The foam panel 36 also includes the pocket 38. The pocket 38 is a channel that projects into the foam panel 36 from an outer surface 40. As such, the pocket 38 is depressed or inset into the foam panel 36. The pocket 38 extends vertically along the upper portion 14 of the seat 10 to complement the vertical length of the tie-down 24 as shown in FIG. 1. In this example, the pocket 38 projects perpendicularly inward and away from the outer surface 40 of the foam panel 36. In other examples, however, the pocket 38 can be oriented differently. The pocket 38 can have any suitable depth as measured from the outer surface 40 to a base 42 of the pocket 38. In this example, the depth is approximately 20 mm. In other examples, the depth of the pocket 38 can be more or less than 20 mm or have a depth in the range of 5 mm to 30 mm. In still other examples, the pocket 38 can extend through the foam panel 36.

A first attachment element 44 is positioned at the base 42 of the pocket 38. The first attachment element 44 is configured to releasably connect to a complimentary second attachment element 46 that is connected to a tail portion 48 of the tie-down 24. In examples in which the pocket 38 extends through the foam panel 36, the first attachment element 44 can be positioned on a frame or other structure of the seat 10. In these examples, the tail portion 48 can extend through the pocket 38 and attach to the first attachment element 44 positioned on the frame or other support structure of the seat 10.

The first attachment element 44 can be any suitable attachment feature such as a piece of hook (or loop) of a hook and loop fastening system. In this example, the first attachment element 44 is a piece of hook material of a hook and loop fastening system that is connected to the base 42. In this example, the first attachment element 44 is connected to the base 42 using an adhesive. In other examples, the attachment element 44 is molded to the base 42 or connected using other suitable attachment methods.

As stated above, the first attachment element 44 is configured to releasably connect to the second attachment element 46 positioned on the tail portion 48 of the tie-down 24. The tail portion 48 of the tie-down 24 is a portion of the tie-down 24 located between the seams 32 that projects into the pocket 38 to pull the cover panel 20 against the foam panel 36. In this example, the tail portion 48 is an extension of the same material of the tie-down 24 that is connected to the second layer 26. In other examples, the tail portion 48 can have other structure or can be a separate piece of material that is connected to the tie-down 24 at or near the pocket 38.

As further shown in FIGS. 2 and 3, the second attachment element 46 is connected to the tail portion 48 at a distal end 50 of the tail portion 48. The distal end 50 of the tail portion is the end of the tail portion 48 positioned away from the first layer 22. In this example, the second attachment element 46 is a cylinder 52 clamped or otherwise connected to the distal end 50 of the tail portion 48. A piece of loop material is secured to the periphery of the cylinder 52. The loop material is configured to releasably connect to the hook material secured to the base 42 of the pocket 38. With this configuration, the tail portion 48 can be inserted into the pocket 38 to secure the tie-down 24 to the foam panel 36.

In other examples, the first attachment element 44 and the second attachment element 46 can be other complimentary fasteners other than hook and loop material. For example, the first attachment element 44 and the second attachment element 46 can have complimentary fastening features such as clips, hooks, hog rings or the like.

The foregoing structure of the cover panel 20 and the foam panel 36 can be used to cover a seat (or other curved surface) with a smooth, uninterrupted material. To install the cover panel 20, the cover panel 20 is stretched or otherwise secured over the foam panel 36. The cover panel 20 extends across the curved portion of the foam panel 36 from the first side 16 to the second side 18 of the seat 10. At this stage of assembly, the cover panel 20 may be loose or have a wrinkled appearance because the first layer 22 does not lay flat against the outer surface 40 of the foam panel 36. To pull the first layer 22 against the outer surface 40 of the foam panel 36, the tail portion 48 of the tie-down 24 is inserted into the pocket 38. A human hand, roller disc or other tool can be used to apply a force at the center of the seat 10 at the location of the pocket 38 to push the tie-down 24 into the pocket 38. When a sufficient force is applied to an occupant-facing surface 54 of the first layer 22, the tie-down is pushed into the pocket 38 so that the first attachment element 44 connects to the second attachment element 46. The connection of the first attachment element 44 to the second attachment element 46 pulls the first layer 22 (and the second layer 26) against the foam panel 36 as shown in FIG. 3.

When the cover panel 20 is installed over the foam panel 36, the tie-down 24, the second layer 26 and the pocket 38 are hidden or otherwise obscured from view by an observer. The observer only sees the occupant-facing surface 54 of the first layer 22. The observer sees the smooth, uninterrupted surface as shown in FIG. 1.

Figure 4:
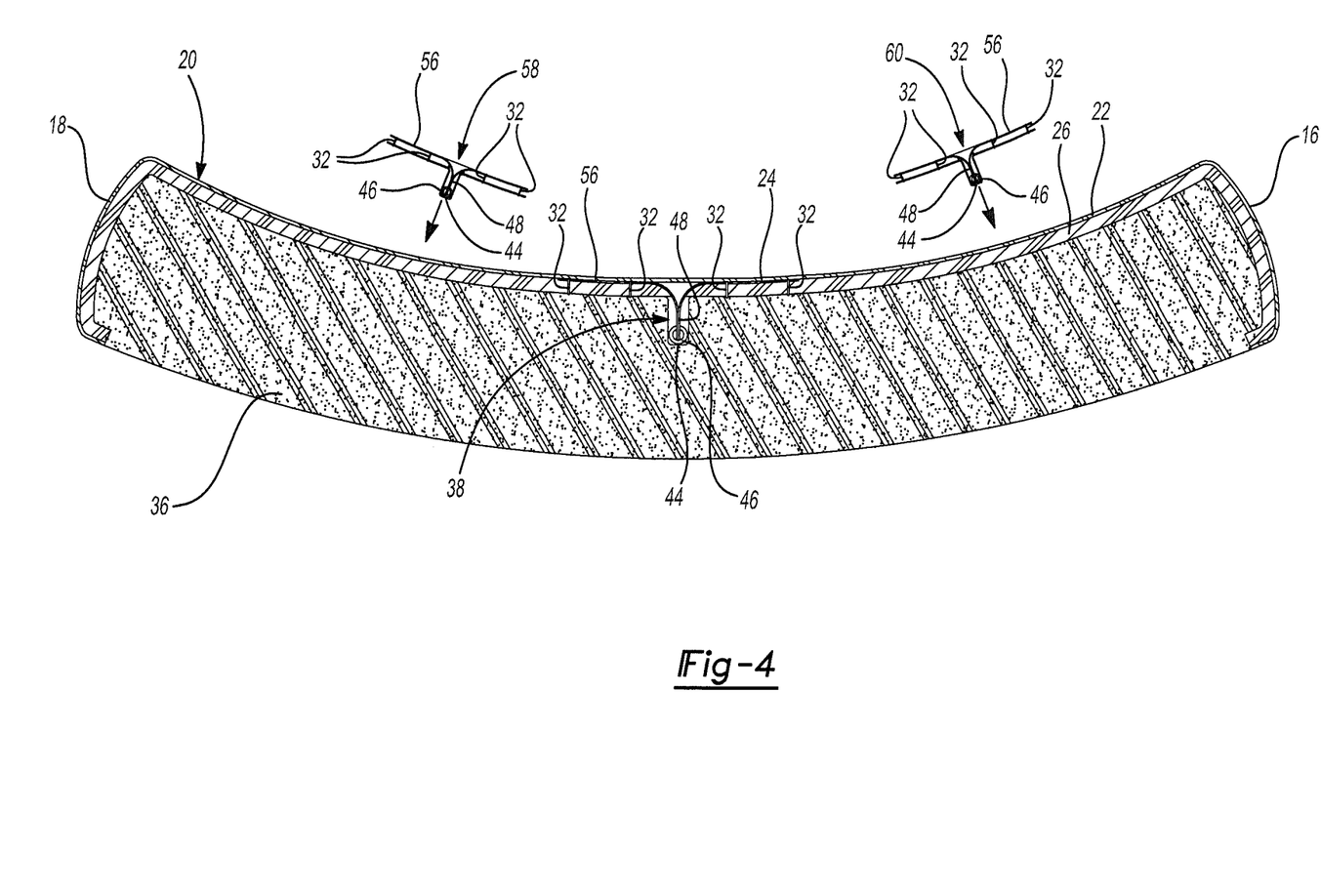
FIG. 4 is a sectional view of another example hidden tie-down in accordance with the present disclosure.

As shown in FIG. 4, another example of a cover panel 20 can include a second tie-down 58 and/or a third tie-down 60. In some applications, a single tie-down 24 may not be sufficient to produce a smooth uninterrupted surface across a curved portion of the seat 10. The second tie-down 58 or the third tie-down 60 may be used on curved surfaces that include complex curved surfaces or on curved surfaces that have relatively small radii. In such situations, the second tie-down 58 and/or the third tie-down 60 may be added to the cover panel 20.

The second tie-down 58 and/or the third tie-down 60 can be inserted at any suitable lateral position on the foam panel 36. In the example shown in FIG. 4, the second tie-down 58 is positioned between the first side 16 and the tie-down 24 and the third tie-down 60 is positioned between the second side 18 and the tie-down 24. The second tie-down 58 and the third tie-down 60 can have the same structure described above with respect to the tie-down 24.

As shown, the second tie-down 58 is connected to the second layer 26 at the seams 32. The second tie-down 58 also includes the tail portion 48 and the first attachment element 44. Similarly, the third tie-down 60 is connected to the second layer 26 at the seams 32. The third tie-down 60 includes the tail portion 48 and the first attachment element 44. While not shown, in examples having the second tie-down 58 and/or the third tie-down 60, a corresponding pocket 38 would be included in the foam panel 36. In other examples, the cover panel 20 can include other quantities of tie-downs 24. While the tie-down 24, the second tie-down 58 and the third tie-down 60 are shown in this example to have the same or similar sizing and similar attachment elements, in other examples, the tie-downs 24, 58, 60 can have differing sizes and can have differing attachment elements.

In examples of the cover panel 20 that have more than one tie-down 24, the multiple tie-downs 24 are connected to the second layer 26 as described above. After the multiple tie-downs 24 are attached to the second layer 26, the second layer 26 is bonded (by lamination or other suitable process) to the first layer 22. In this manner, a multi-layer cover panel 20 is created that can then be installed over the foam panel 36 as previously described.

Figure 5:
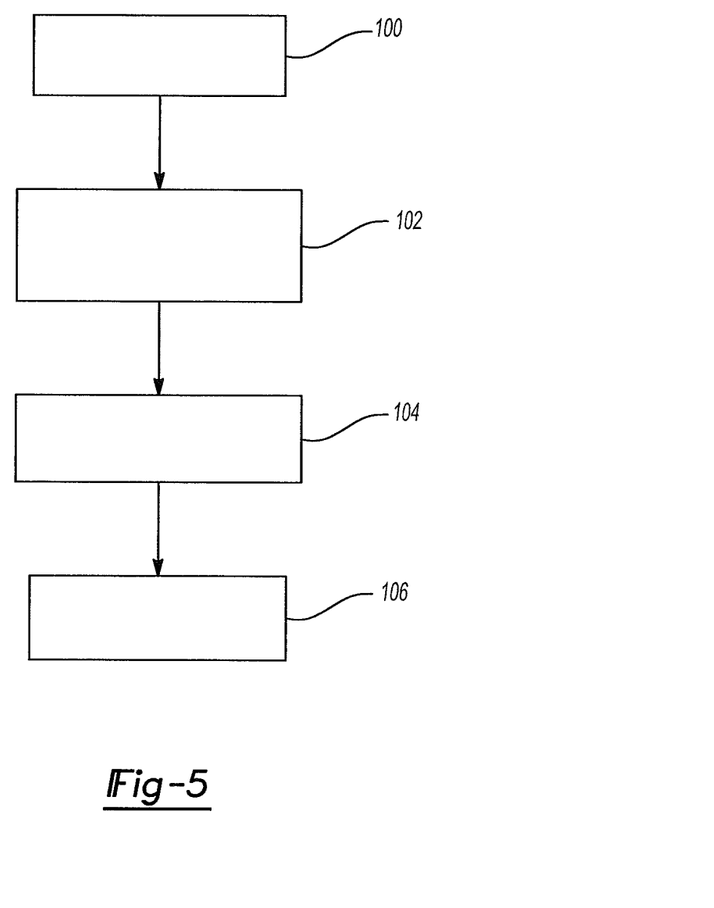
FIG. 5 is a flow chart illustrating one example method of producing an uninterrupted surface across a concave foam structure in accordance with the present disclosure.

As shown in FIG. 5, one example method of producing an uninterrupted surface across a concave surface is described in the context of producing the seat 10 with a cover panel 20 with the single tie-down 24. As can be appreciated, the method and principles described herein can be applied in the context of the cover panel 20 with multiple tie-downs 24 as well as to the production of other curved surfaces that may be covered by a surface material.

In the example method of FIG. 5, at 100, the tie-down 24 is sewn (or otherwise connected) to a substrate material (e.g., the second layer 26) such that a tension portion 56 of the tie-down 24 is positioned parallel to the substrate material (or second layer 26) and the tail portion 48 of the tie-down 24 projects away from the tension portion 56. As described above, the tie-down 24 can be attached to the substrate material (or second layer 26) using other attachment methods as well.

At 102, the substrate material (or second layer 26) is bonded to a surface material (or first layer 22). The substrate material, as described above, can be bonded to the surface material by laminating the substrate material to the surface material. In other examples, other bonding methods can be used. The substrate material (or second layer 26) is bonded to the surface material (or first layer 22) such that the substrate layer is parallel to the surface material and to the tension portion 56 of the tie-down 24.

At 104, the cover panel 20, including the bonded surface material (or first layer 22), the substrate material (or second layer 26) and the tie-down 24, is installed over the foam panel 36 of the seat 10.

At 106, the tie-down 24 is connected to the foam panel 36. In the example cover panel 20 described above, the tie-down 24 is connected to the foam panel 36 by inserting the tail portion 48 of the tie-down 24 into the pocket 38 to connect the first attachment element 44 to the second attachment element 46. In other examples, the tie-down 24 can be connected to the foam panel 36 using other attachment methods. After the first attachment element 44 is connected to the second attachment element 46, the cover panel 20 lies adjacent to the foam panel 36 in a smooth uninterrupted configuration across the concave portion of the seat 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A cover panel configured to be installed over foam of a vehicle seat comprising:
   a first layer including an occupant-facing surface and a foam-facing surface, the foam-facing surface located opposite to the occupant-facing surface, the first layer configured to cover at least a portion of the foam of the vehicle seat;
   a second layer bonded to the foam-facing surface of the first layer such that the second layer is obscured from view by the first layer; and
   a tie-down disposed between the first layer and the second layer, stitched to the second layer and projecting away from the foam-facing surface, wherein the tie-down is configured to tension the first layer when the tie-down is pulled away from the foam-facing surface.

2. The cover panel of claim 1 wherein the second layer is disposed parallel to the first layer.

3. The cover panel of claim 1 wherein the first layer covers the second layer and the tie-down such that the second layer and the tie-down are not visible when the cover panel is assembled on the vehicle seat.

4. The cover panel of claim 1 wherein:
   the tie-down is stitched to the second layer at one or more seams; and
   the one or more seams are obscured from view by the first layer such that only the first layer is visible when the cover panel is assembled on the vehicle seat.

5. The cover panel of claim 1 further comprising a second tie-down connected to the second layer and projecting away from the foam-facing surface, wherein the second tie-down is configured to tension the first layer when the second tie-down is pulled away from the foam-facing surface.

6. The cover panel of claim 1 wherein the second layer is a layer of foam padding.

7. The cover panel of claim 1 wherein the tie-down includes a first attachment element, the first attachment element configured to connect to a complimentary second attachment element disposed in a pocket in the foam of the vehicle seat.

8. The cover panel of claim 1 wherein:
the tie-down includes a tension portion and a tail portion;
the tension portion is stitched to the second layer and is disposed between the first layer and the second layer; and
the tail portion projects away from the tension portion and is configured to project into a pocket located in the foam of the vehicle seat.

9. The cover panel of claim 1 wherein the first layer has a smooth surface configured to cover a portion of the vehicle seat having a concave profile.

10. A vehicle seat including the cover panel of claim 1.

11. A vehicle seat comprising:
a foam structure having a concave profile and a pocket; and
a cover panel positioned over the foam structure, the cover panel including:
a visible first layer extending over the concave profile and the pocket;
a second layer disposed parallel to the first layer and bonded to the first layer such that the second layer is obscured from view by the first layer; and
a tie-down connected to the second layer and disposed between the first layer and the second layer, the tie-down including a tail portion that projects away from the first layer and into the pocket of the foam structure wherein the tie-down is configured to tension the first layer when the tie-down is pulled away from the first layer to maintain a smooth surface of the first layer across the concave profile and the pocket.

12. The vehicle seat of claim 11 wherein the tie-down and the second layer are covered by the first layer.

13. The vehicle seat of claim 11 wherein the pocket is disposed at a center of the concave profile.

14. The vehicle seat of claim 11 wherein:
the tie-down is stitched to the second layer by a plurality of seams; and
the seams are covered by the first layer.

15. The cover panel of claim 1 wherein the occupant-facing surface of the first layer is unwrinkled when the tie-down tensions the first layer.

* * * * *